United States Patent
Zhang et al.

(10) Patent No.: US 9,942,622 B2
(45) Date of Patent: Apr. 10, 2018

(54) METHODS AND SYSTEMS FOR SYNCHRONIZING MEDIA STREAM PRESENTATIONS

(71) Applicant: Hiperwall, Inc., Irvine, CA (US)

(72) Inventors: Qian Zhang, Irvine, CA (US);
Sung-Jin Kim, Irvine, CA (US);
Stephen Francis Jenks, Laguna Beach, CA (US)

(73) Assignee: Hiperwall, Inc., Irvine, CA (US)

( * ) Notice: Subject to any disclaimer, the term of this patent is extended or adjusted under 35 U.S.C. 154(b) by 283 days.

(21) Appl. No.: 14/605,904

(22) Filed: Jan. 26, 2015

(65) Prior Publication Data
US 2015/0215497 A1 Jul. 30, 2015

Related U.S. Application Data

(60) Provisional application No. 61/931,520, filed on Jan. 24, 2014.

(51) Int. Cl.
*H04N 5/073* (2006.01)
*H04N 21/81* (2011.01)
(Continued)

(52) U.S. Cl.
CPC ..... *H04N 21/8153* (2013.01); *H04N 21/4307* (2013.01); *H04N 21/4347* (2013.01);
(Continued)

(58) Field of Classification Search
CPC . H04N 5/073; H04N 21/8153; H04N 21/4307
(Continued)

(56) References Cited

U.S. PATENT DOCUMENTS

| | | | |
|---|---|---|---|
| 5,969,728 A | 10/1999 | Dye et al. | |
| 7,511,718 B2 * | 3/2009 | Subramanian | G06F 9/545 345/473 |

(Continued)

FOREIGN PATENT DOCUMENTS

| | | |
|---|---|---|
| CA | 2231780 | 12/2006 |
| CA | 2491522 | 12/2014 |
| JP | 2002016918 A | 1/2002 |

OTHER PUBLICATIONS

Yang, Hsueh-Szu, et al., Time Stamp Synchronization in Video Systems, Teletronics Technology Corporation, pp. 1-8.
(Continued)

*Primary Examiner* — Jonathan Messmore
(74) *Attorney, Agent, or Firm* — Knobbe Martens Olson & Bear LLP

(57) ABSTRACT

A system synchronizes one or more media streams, such as video stream or audio streams, by embedding frame identifiers in each compressed media stream, and then by using synchronizing signals to render each frame simultaneously by referencing the embedded frame identifier. Since the frame identifier is embedded in between encoded frames of the compressed media stream without altering any of the compressed, encoded data, the frame identifier information could be rapidly embedded without creating lag associated with manipulating existing data. This technique could be used, for example, to synchronize a single HD video on a plurality of display devices (e.g. a football game on a wall of video monitors), or to synchronize a plurality of HD video streams on a single display device (e.g. a plurality of live video feeds on a single computer monitor).

18 Claims, 5 Drawing Sheets

(51) Int. Cl.
  *H04N 21/43* (2011.01)
  *H04N 21/434* (2011.01)
  *H04N 21/6336* (2011.01)
  *H04N 21/8547* (2011.01)
  *H04N 21/431* (2011.01)

(52) U.S. Cl.
  CPC ..... *H04N 21/4348* (2013.01); *H04N 21/6336* (2013.01); *H04N 21/8547* (2013.01); *H04N 21/4314* (2013.01)

(58) Field of Classification Search
  USPC .................................................. 375/240.28
  See application file for complete search history.

(56) References Cited

U.S. PATENT DOCUMENTS

| | | | |
|---|---|---|---|
| 7,742,481 B2 | 6/2010 | Saito | |
| 8,358,670 B2 | 1/2013 | Na et al. | |
| 2005/0018775 A1 | 1/2005 | Subramanian | |
| 2008/0005128 A1* | 1/2008 | Jayaraman | G06F 17/30843 |
| 2008/0137756 A1* | 6/2008 | Scherlis | H04N 21/235 |
| | | | 375/240.28 |
| 2009/0205008 A1 | 8/2009 | Wollmershauser | |
| 2011/0010739 A1 | 1/2011 | Yun et al. | |
| 2011/0167462 A1* | 7/2011 | O'Connor | H04N 7/173 |
| | | | 725/110 |
| 2011/0208766 A1 | 8/2011 | Lang | |
| 2012/0198507 A1 | 8/2012 | Geiling et al. | |
| 2013/0033642 A1* | 2/2013 | Wan | H04N 19/39 |
| | | | 348/495 |
| 2013/0209063 A1 | 8/2013 | Suh et al. | |
| 2013/0258054 A1* | 10/2013 | Park | H04N 13/0051 |
| | | | 348/43 |
| 2014/0098849 A1 | 4/2014 | Panich et al. | |
| 2014/0159992 A1* | 6/2014 | Cai | G06F 3/1446 |
| | | | 345/2.3 |
| 2014/0189749 A1 | 7/2014 | Gordon | |
| 2014/0307168 A1 | 10/2014 | Law et al. | |

OTHER PUBLICATIONS

PCT Search Report and Written Opinion re Application No. PCT/US2016/014572 dated Jan. 21, 2016.

* cited by examiner

METHODS AND SYSTEMS FOR SYNCHRONIZING MEDIA STREAM PRESENTATIONS

This application claims the benefit of priority to U.S. provisional application 61/931,520 filed on Jan. 24, 2014. This and all other extrinsic references referenced herein are incorporated by reference in their entirety.

FIELD OF THE INVENTION

The field of the invention is synchronization of video streams.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Ensuring that media presentations are synchronized can be a tricky business. Delays could occur between one stream and another stream, or between one display and another display, which need to be accounted for so that all streams and/or all displays are synchronized with one another. CA 2,231,780 to Kerr and CA 2,491,522 to Jayant both teach systems that introduce a clock sample into a digitized audio stream and a digitized video stream. The clock samples could be compared against one another to ensure that the streams are synchronized with one another, and when the streams lose synchronization, a delay could be applied to the quicker stream to ensure that the streams are synchronized. Kerr and Jayant's system, however, only allows a single video stream to sync with a single audio stream on a single display device. Sometimes, a stream needs to be synced with a plurality of displays.

US 2009/0205008 to Wollmershauser teaches a system that allows a system to sync a plurality of remote devices, such as set top boxes, with one another by using frame identification values, such as hash values or sequential identifiers. A master set top box pings other set top boxes with the identifier of a frame that is being displayed. This ping is used by other set top boxes to synchronize those set top boxes with the master, and ensure that all of the set top boxes are simultaneously broadcasting a stream in sync. Wollmershauser, however, requires each frame to already have an identifier to broadcast that all set top boxes recognize. Many encoded streams are not encoded with frame identifiers that can universally be analyzed or broadcast.

US 2011/0010739 to Yun teaches a method for transmitting a stereoscopic video to a left view and a right view. Yun's video generation unit takes an inputted video signal and uses it to encode a stream with a Decoding Time Stamp (DTS) or a Presentation Time Stamp (PTS). Either time stamp could be inserted into the stream based on a system clock, and the system then synchronizes the left and right views based on the inserted time stamp. Yun's video generation unit, however, takes time to encode the inputted video signal into an encoded signal, which is fine for low-resolution or computer-generated input streams, but can be too slow for real-time high-definition streams, such as live video streams of HD sports or news broadcasts.

Thus, there remains a need for a system and method that synchronizes media stream presentations.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer or computer system should be read to include any suitable combination of computing devices, including servers, interfaces, systems, databases, agents, peers, engines, modules, controllers, computer blades in a blade server, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of wired or wireless packet switched network.

The inventive subject matter provides apparatus, systems, and methods in which one or more frame identifiers are inserted into a compressed video stream to synchronize the compressed video stream in accordance with a synchronization signal.

A contemplated system architecture has one or more stream receiving modules that capture one or more media streams from a media broadcast source (e.g. a cable television service, a video conferencing system, a live camera, a DVD player), a metadata generation module that generates metadata to be inserted into the media stream received by the stream receiving module, a stream transmission module that transmits the modified media stream, a control module that manages the system and sends synchronizing signals, and media nodes that receive the modified media streams and synchronizing signals to selectively present the media as a function of the synchronizing signal and the inserted metadata. While the entire system could be implemented on a single computer system with a non-transient memory having computer instructions for a processor to construct the modules that perform the aforementioned tasks, each of these components is preferably a separate computer device that is coupled to the other computer devices through a wired or wireless network connection. Having separate computer devices each with its own processor(s) and software instructions saved on its non-transient memory improves the rate at which tasks are accomplished to ensure that there is little to no lag, which is important when synchronizing live-action high-definition media. In some embodiments, some of the aforementioned modules are combined within computer systems.

In a preferred embodiment, the media sources are separate computer systems (e.g. cable boxes or video cameras) that send streaming media to a metadata computer system. The metadata computer system could have (1) one or more stream receiving modules that receive streams from the media sources, (2) one or more metadata generation modules that generate metadata to be inserted into input streams, (3) one or more controller communication modules that transmit the metadata to a controller, and (4) one or more stream communication modules that transmits the modified media stream to one or more media nodes. A controller computer system could have a synchronizing signal generation module that generates a synchronizing signal that synchronizes the transmitted modified media streams with one another. Lastly, each media node could be a separate computer system located proximally to its designated media outlet device to selectively output the media stream. As used herein, a "media stream" is a stream of data that represents a stream of media, such as video media, audio media, tactile media, olfactory media, or gustatory media. Such media streams need a media outlet to render the media stream to a sensory device, such as a screen sender that renders video data to a display screen for video media, an audio sender that renders audio data to speakers for audio media, a tactile sender that renders physical movement data to a syntactic output device for tactile media, an olfactory sender that renders smell data to a smell machine for olfactory media, or even a gustatory sensor that renders taste data to a taste machine for gustatory media in order to ensure that a user can interpret such media streams.

A media broadcast source is generally a computer device that outputs one or more compressed media streams. As used herein, a "compressed media stream" is a media stream in a compressed format that can be decompressed into its original format. For example, a video stream in its original format generally dictates a pattern of colors on a 2D surface frame-by-frame. Such a stream could be compressed into an encoded format, such as MPEG-2 Part 2(MPEG2), MPEG-4 Part 2(MPEG4), MPEG-4 Part 10(H.264), HEVC (H.265), MJPEG, Theora, Dirac, RealVideo RV40, VP8, and VP9, which would be easier to transport, and is then decompressed later for viewing. Such compression is typically performed by software codecs executed by a processor on the streamer. In some embodiments, a media broadcast source performs the encoding of the media stream, such as when a camera captures a series of 2D frames and encodes those frames into a QuickTime H.264 stream. In other embodiments, a media broadcast source acts as a multiplexor to output a selection of encoded media streams, such as a cable set top box or a computer PCI card that outputs only a stream from a selected sports channel. Typically, a media broadcast source comprises a device that transmits one or more related media streams, such as a video stream and an related audio stream, to the media source, which then outputs a compressed media stream to be received by the stream receiving module and processed by the metadata generation module, or metadata generator.

A metadata generator generates metadata to be inserted into the compressed media stream received from the streamer. Preferably, the metadata generator inserts data in between encoded media frames such that none of the media frames is ever decompressed, decoded, or re-encoded, or altered in any way before being retransmitted in the output media stream. As each media stream is typically comprised of a sequence of encoded media frames, the metadata could be inserted between any of the encoded media frames such that each of the encoded media frames remain unaltered and untouched. In other words, both the compressed media stream received from the stream receiving module and the modified compressed media stream modified by the metadata generator both have the unaltered, original encoded media frames embedded in the compressed media stream. Some encoded media frames might have a PTS or a DTS generated by the codec embedded either within the encoded media frame, or located proximally to the encoded media frame in the stream. The metadata generator also preferably does not alter the PTS, DTS, or any other data in the compressed media stream, leaving all the original data of the compressed media stream intact—only adding metadata in between some of the encoded frames of the compressed media stream to generate the modified compressed media stream.

The metadata generator is generally configured to insert metadata into the compressed media stream as the stream is being received by the data streaming module. Preferably, the metadata generator inserts the metadata as blocks of metadata into the media stream. Each metadata block is typically associated with a frame or a set of frames located just before or just after the metadata block where it has been inserted into the compressed media stream. Types of metadata that is inserted into the media stream could include a frame identifier (a unique number for that compressed media stream), a thumbnail image of the associated media frame (or one of the associated media frames in a block of frames), and/or a sound byte from a block of associated media frames. Consecutive metadata blocks could vary in content. For example, a metadata generator could be configured to generate a metadata block having a frame identifier for every frame in a compressed media stream, but only generate a thumbnail image for every n frames in a compressed media stream (where n could be 5, 10, 15, 20, or some other suitable value). As used herein, a "thumbnail image" is a reduced resolution image representation of a single frame of a video stream. The thumbnail usually has substantially smaller resolution than its associated frame, thus will occupy a much smaller memory space to store than its counterpart. Since images for a video frame could require data from a plurality of frames to construct, the metadata generator is preferably configured to render data from a plurality of frames in order to generate a thumbnail. While the metadata generator might need to decode a frame in order to render a thumbnail image, the decoded frame generally isn't re-encoded into an encoded frame for transport.

Transmitters are configured to transmit signals, such as the modified compressed media stream, a synchronizing signal, and/or a media filter to one or more media nodes. As used herein, a "synchronizing signal" is a signal sent by the transmitter that dictates the timing of when certain frames in various transmitted modified compressed media streams are rendered to ensure that all of the streams are synchronized with one another. Preferably, the synchronizing signal is a heartbeat pulse that is periodically sent from the transmitter, such as $\frac{1}{10}$, $\frac{1}{5}$, $\frac{1}{2}$, 1, 2, or 5 seconds. As used herein, a "media filter" is a signal sent by the transmitter to a media outlet that dictates what portion of the media stream should be playing on what portion of a media outlet. As used herein, a "media node" is a computer module, or preferably an entire computer system having a separate processor and non-transient memory, which is configured to render media data to a media output device, such as a display screen or a speaker.

In some embodiments, a single modified compressed media stream is sent to a plurality of media nodes, such as, for example, a single video stream sent to a wall of video display monitors. In other embodiments, a plurality of modified compressed media streams is sent to a single media node, such as, for example, a single virtual reality (VR) visor headset with a plurality of views that change as a user shifts his/her viewpoint. In still other embodiments, the system is built such that a plurality of media streams are sent to a plurality of media outlets, all controlled by one or more controller computer systems.

Each media node preferably renders the modified compressed media data as a function of both the received frame identifier and the synchronizing signal to ensure that the media node is appropriately rendering the media stream. For example, the synchronizing signal could contain a frame identifier and a rendering time to ensure that the media frame associated with the frame identifier is being rendered at the rendering time. With such a configuration, the synchronizing signal could comprise a series of synchronizing heartbeat pulses, where each pulse is a frame identifier and a time stamp, which resynchronizes the media stream rendering at each time stamp. In embodiments with a plurality of media nodes for a single media stream, for example a plurality of screens on a video wall for a single HD sports game broadcast, this ensures that all of the screens are in sync with one another. In embodiments with a single media node for a plurality of media streams, for example a single VR headset for a plurality of different views, this ensures that all of the media streams are in sync with one another when the viewpoint transitions from a first viewpoint to a second viewpoint.

Each media node also preferably renders the modified compressed data as a function of the media filter to ensure that the correct portion of the modified compressed media stream is being rendered in the correct portion of the media outlet. In embodiments with a plurality of media nodes for a single media stream, for example a plurality of screens on a video wall for a single HD sports game broadcast, this ensures that a screen in the top right-hand corner only renders the top right-hand portion of the stream while the screen in the bottom left-hand corner only renders the bottom left-hand portion of the stream. In embodiments with a single media node for a plurality of media streams, for example a single VR headset for a plurality of different views, this ensures that the different media streams are patched together correctly as a user's viewpoint moves from one direction to another.

A controller module is preferably used to dictate the behavior of each of the aforementioned modules, and while a controller user interface is preferably presented to allow a user to modify such behavior. The controller user interface is preferably configured to allow a user to define which portions of each media stream are rendered on portions of each media node. For example, the controller user interface could be used by a user to dictate that portions of a single media stream will be spread out among a plurality of media nodes, or the controller user interface could be used by a user to dictate that a plurality of media streams will be rendered on a single media node in synch with one another. The controller user interface also preferably allows a user to replay portions of the stream that are buffered in memory and display a thumbnail as a visual representation of a desired frame (or play an audio clip as an audio representation of the start of a desired group of frames) to assist the user in selecting a portion of the media stream to seek to.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including quickly rendering an HD video stream on a plurality of screens by inserting synchronizing data without needing to encode or decode any portion of the video stream and giving quick access to a thumbnail by inserting thumbnail images into an HD video stream so that the controller software does not need to individually render frames while searching for an appropriate replay point.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

The inventive subject matter provides apparatus, systems, and methods in which a system synchronously renders media streams on media outlet devices.

Figure 1:
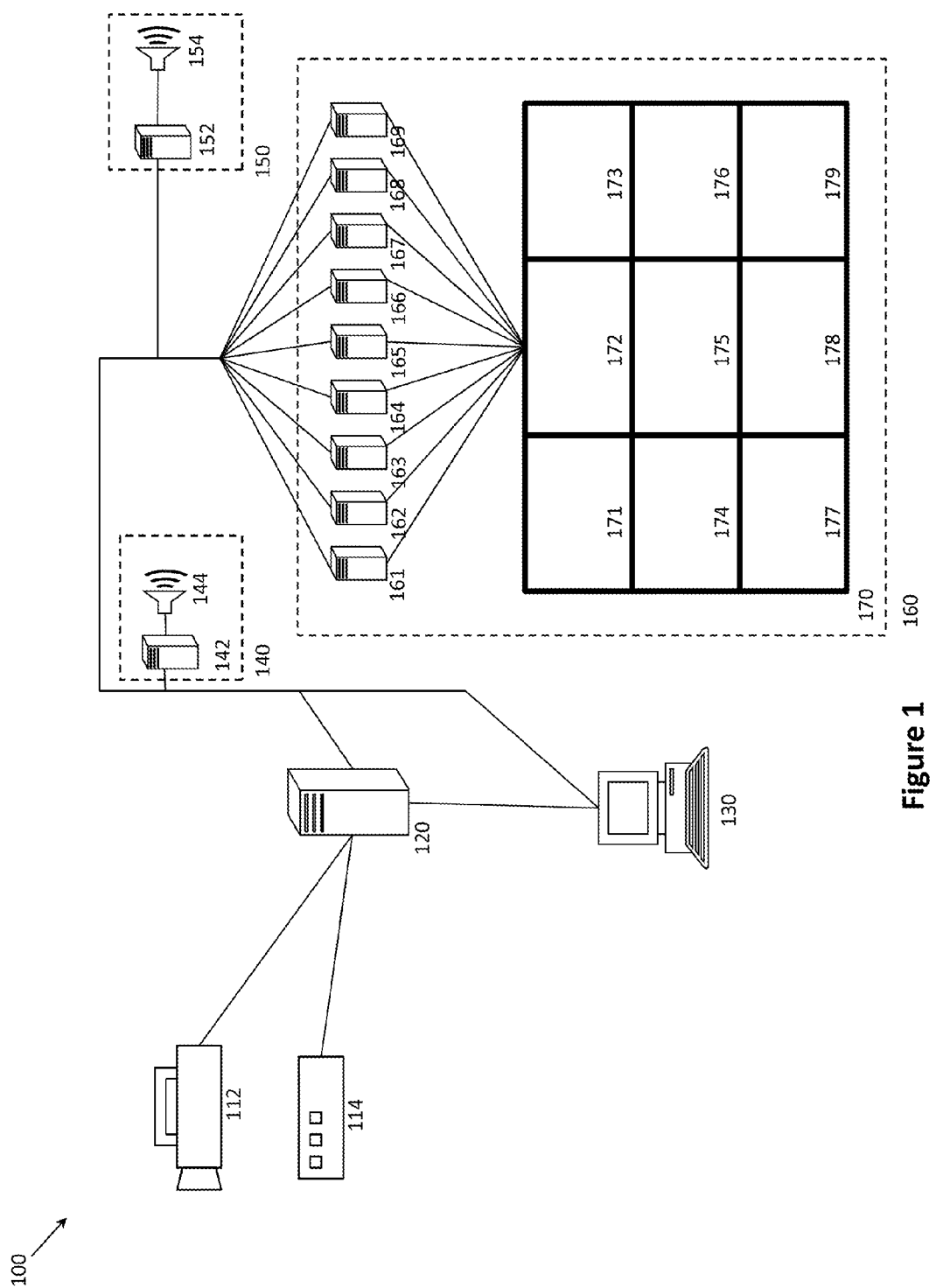
FIG. 1 is a hardware schematic of components of the present invention streaming media data to a plurality of media nodes.

In FIG. 1, a contemplated system 100 has media broadcast sources 112 and 114, metadata computer system 120, controller computer system 130, and media nodes 140, 150, and 160. While the computer systems are shown as separate devices directly coupled with wires, the computer systems could all be combined into a single device, such as a blade server having multiple blades, where each blade is a separate computer system with its own processor, network adapter, and dedicated non-transient computer readable memory. In other embodiments, each of the computer systems could be separated into distal devices all connected through a wired or wireless network, such as the Internet.

Media broadcast source 112 is a streaming video camera that sends live streaming video and audio data to metadata computer system 120. Typical video cameras contain codecs that encode captured media into a digital stream, such as an MPEG stream having both video and audio data, that is sent to metadata computer system 120. Media broadcast source 114 is a cable set top box that streams selected audio and video data to metadata computer system 120, such as a football game on ESPN in HD, or a selected ON-DEMAND movie. Typical cable set top boxes are configured to select compressed media streams to output from a cable service. While broadcast sources 112 and 114 are shown as a streaming video camera and a streaming cable box, respectively, to transmit video and/or audio media streams, broadcast sources 112 and 114 are used euphemistically to represent any device that transmits compressed media stream(s) via a suitable wired or wireless electronic medium, such as a computer streaming presentation data, a DVD player streaming audio/video data, or an olfactory sensor streaming smell data. Broadcast sources 112 and 114 both send streaming media data (e.g. a video stream and an audio stream) to metadata computer system 120 for processing. Such broadcast sources typically have at least one processor, at least one non-transient computer readable medium, and at least some instructions on the non-transient computer readable medium to instantiate software to broadcast compressed media stream to metadata computer system 120.

Metadata computer system 120 is a computer system configured to receive one or more compressed media streams from one or more broadcast sources, insert metadata into the appropriate compressed media stream, and/or export the modified compressed media stream(s) to media nodes, such as media node 140, 150, and/or 160. Contemplated metadata includes frame identifiers, which are unique numbers used to identify a frame within a given media stream, and image thumbnails created as a representation of a moment within the stream. Preferably, metadata computer system 120 is configured to quickly insert metadata into the compressed media stream without first decoding or re-encoding any of the frames of the compressed media stream to ensure that any delay between compressed media stream entering metadata computer system 120 and modified compressed media stream exiting metadata computer system 120 is negligible, for example less than 500, 400, 300, 200, or even 100 milliseconds. In embodiments where the metadata computer system constructs image thumbnails (thereby decompressing an image of a frame), the metadata computer system is preferably configured to only render a low-resolution portion of the frame, as it's faster to render a low-resolution thumbnail than to render a high-resolution full-sized frame. As used herein, a "low resolution" thumbnail is an image that is of lower resolution than the optimum resolution of a media frame. In embodiments where the metadata computer system constructs audio clips (thereby decompressing a set of audio frames), the metadata computer system is preferably configured to render a set audio clip size, such as 3 seconds, 5 seconds, or 10 seconds, and save that clip as metadata representative of a set of audio media frames. Whether constructing image thumbnails or audio clips, the system is preferably configured to construct the thumbnails or audio clips for only a fraction of the total number of media frames, since rendering such metadata takes time and it is frequently not necessary to have a thumbnail of every frame in a video stream or every moment in an audio stream.

The metadata created by metadata computer system 120 is also sent, preferably without any of the compressed media stream, to controller computer system 130, so that controller computer system 130 could send synchronizing signals using such metadata. Metadata computer system 120 preferably has at least one processor, at least one non-transient computer readable medium, and at least some instructions on the non-transient computer readable medium to instantiate software that receives compressed media streams, generate metadata for one or more frames of the compressed media stream, and send modified compressed media data to one or more media nodes.

Controller computer system 130 is a computer system configured to receive metadata information from metadata computer system 120 to construct an index of the metadata created by metadata computer system 120. Such an index typically includes metadata such as frame identifiers, thumbnail images of a video stream, and/or audio clips of an audio stream. Using the index, computer controller system 130 could generate a synchronizing signal that is sent to media nodes 140, 150, and 160 to synchronize the media streams sent to the media nodes. Such a synchronization signal is preferably sent regularly, like a heartbeat pulse. For example, such a synchronization signal is preferably sent every second, every 500 milliseconds, every 200 milliseconds, or even every 50 milliseconds. It is not always necessary to send a heartbeat pulse for each media frame. Contemplated synchronization signals could be as simple as a frame number with a rendering timestamp, locking a stream to a schedule, or could be as complex as a frame number with a dependent triggering formula that calculates a rendering timestamp as a function of one or more inputs to one or more of the media nodes. For example, a synchronization signal could wait for an input from a media node to signal a start time for all streams. Each of the timestamps could then have a rendering timestamp that is added to the start time in order to keep the streams synced to one another. Controller computer system 130 preferably has at least one processor, at least one non-transient computer readable medium, and at least some instructions on the non-transient computer readable medium to instantiate software that generates synchronizing signals to be used by a media node.

In some embodiments, the functions of metadata computer system 120 and controller computer system 130 could be combined into a single computer system that performs all tasks. In such a system, of course, the constructed metadata need not be sent outside of a compressed media stream because the combined computer system would be able to construct the index on its own.

Media node 140 is shown as a computer system 142 coupled with a speaker 144. Media node 150 is shown as a computer system 152 coupled with a speaker 154. Media node 160 is shown as nine separate computer systems 161, 162, 163, 164, 165, 166, 167, 168, and 169 coupled with displays 171, 172, 173, 174, 175, 176, 177, 178, and 179, respectively. Each of the nine displays 171, 172, 173, 174, 175, 176, 177, 178, and 179 compose video wall 170. While media nodes 140, 150, and 160 are shown as a left speaker, right speaker, and video wall, other media nodes could be used without departing from the scope of the invention, such as a tactile glove that sends tactile media information via a stream or a set of eight audio speakers to represent a 7.1 surround sound system. In addition, while each media outlet device is connected to a separate computer system, fewer computer systems, or even just one computer system, could be used to render media streams to the media output devices without departing from the scope of the invention.

Each computer system in its respective media node is configured to synchronize the incoming modified compressed stream as a function of the synchronizing signal received from controller computer system 130. For example, if the synchronizing signal is a heartbeat pulse having a media frame identifier and a time stamp, then the media node would preferably set up a schedule to display that media frame at the given time stamp, continue to decode the streaming media from that media frame, and then resynchronize by rendering the associated media frame when the next scheduled time stamp occurs.

Preferably, each computer system is also configured to render the modified compressed stream as a function of an incoming media filter sent from the controller computer system 130. For example, controller computer system 130 might send a media filter to media node computer system 142 instructing that computer system to only play audio stream information for the left channel, and send a separate media filter to media node computer system 152 instructing that computer system to only play audio stream information for the right channel. Likewise, controller computer system 130 might send separate media filter information to each of media node computer systems 161, 162, 163, 164, 165, 166, 167, 168, and 169 to ensure that their respective displays only display the portion of the stream dedicated to that portion of the media wall. (e.g. computer system 161 would be configured to only display the upper left portion of the video stream in display 171, while computer system 173 would be configured to only display the upper right portion of the video stream in display 173.

Figure 2:
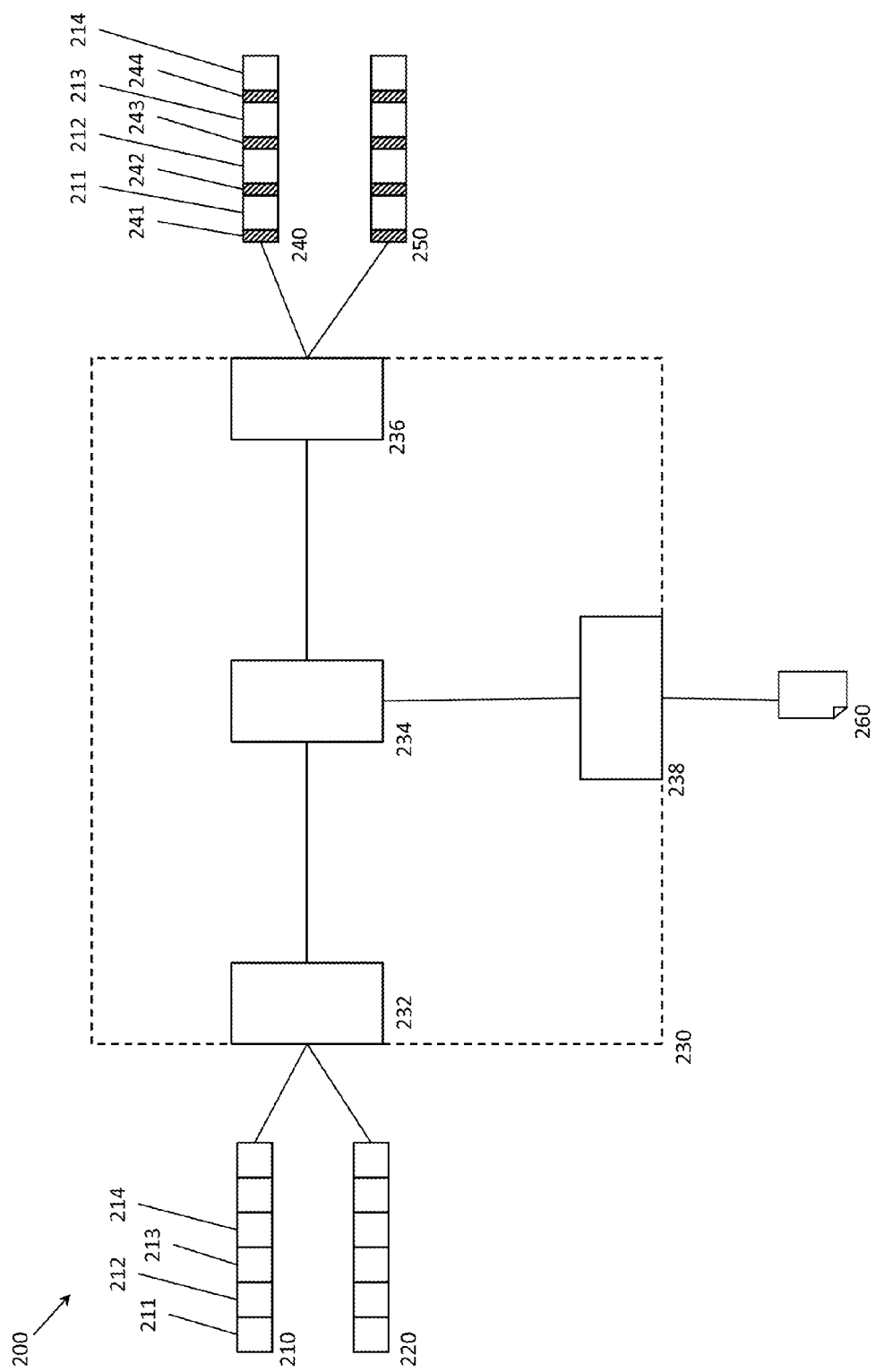
FIG. 2 is a software module schematic of a metadata computer system of FIG. 1.

In FIG. 2, an exemplary software schematic 200 of the modules that could be instantiated in metadata computer system 120 is shown, having stream receiving module 232, metadata generating module 234, stream transmitting module 236, and metadata transmitting module 260. Stream receiving module 232 receives incoming streams, such as stream 210 and stream 220, from one or more media broadcast sources through a suitable wired or wireless data transmission. Such streams typically have a series of encoded media frames, such as encoded frame 211, encoded frame 212, encoded frame 213, encoded frame 214, and encoded frame 215. Such encoded streams might have PTS data or may not, depending upon the format of the media stream. Stream receiving module 232 preferably forwards the stream in real-time to metadata generating module 234. Metadata generating module 234 preferably generates metadata for every encoded frame in a stream. However, in some embodiments, when the rate at which the encoded stream is received by stream receiving module 232 exceeds the rate at which metadata generating module 234 can generate metadata, metadata generating module 234 is configured to only generate metadata for the currently received stream. In this manner, metadata generating module 232 is always generating metadata in real-time, even if the module is unable to generate metadata for every frame.

Exemplary metadata includes frame identifiers—such as unique numbers to identify a frame, frame properties—such as properties of a frame gleaned by examining the frame (e.g. the dimensions and resolution of a frame of a video frame, the volume and tone of an audio frame), a frame thumbnail—such as a low-resolution image of a video frame, a sound clip of a set of frames, or some other suitable metadata. Some or all of the generated metadata could be inserted into the compressed media stream, but preferably only the frame identifier and is inserted into the compressed media stream to ensure that the output modified compressed media stream is sent without a significant delay (e.g. more than 100 or 500 milliseconds or even more than 1 or 2 seconds). In some embodiments, the metadata could include both the frame identifier and a thumbnail. Preferably, less frames have an associated metadata block with both a frame identifier and a thumbnail than frames that have an associated metadata block with only a frame identifier. For example, in one embodiment every frame could have an associated metadata block having a frame identifier, and every 10 frames have an associated metadata block having both a frame identifier and a thumbnail. In another embodiment, for every 4 metadata blocks created having a frame identifier, a $5^{th}$ metadata block is created having a frame identifier and a thumbnail.

Some input compressed media streams send media frames out of order. For example, a first frame that is displayed before a second frame which is displayed before a third frame might be transmitted with the second frame first, then the third frame, then the first frame. Metadata generating module 234 preferably is configured to read a plurality of frames at once, such as 5, 10, 15, 20, or even 50 frames at once, in order to determine the proper frame order, and inserts generated frame identifiers according to the shuffled order to match the order of the shuffled frames. For example, where a segment of a media stream is normally played A-B-C-D-E on a media output device, consecutive frame identifiers for the 5 frames are 1-2-3-4-5 (where 1 matches A, 2 matches B, 3 matches C, 4 matches D, and 5 matches E), and the media stream is sent in the order C-D-A-E-B, the frame identifiers would be inserted 3-C-4-D-1-A-5-E-2-B so that the synchronizing signal will appropriately identify consecutive frames to output, even when the original input compressed media stream is sent in a non-consecutive order. Such is also the case in embodiments where frame identifiers are not generated for every frame. For example, where a segment of a media stream is normally played A-B-C-D-E-F-G-H-I-J, consecutive frame identifiers assigned to that segment are 1-2, and the media stream is sent in the order D-E-A-C-B-F-I-G-H-J, the frame identifiers could be inserted D-E-1-A-C-B-2-F-I-G-H-J so that frame identifier 1 properly matches with frame A and frame identifier 2 properly matches with frame F. In other words, metadata generating module 234 is configured to detect whether an input compressed media stream has media frames that are sent in a non-consecutive order, and is also configured to insert metadata frame identifiers in a non-consecutive order into the input compressed media stream that matches the non-consecutive order of the input compressed media stream.

Once metadata is inserted in between frames of the compressed media stream, the modified compressed media stream is transmitted via stream transmitting module 236 to one or more media nodes. Here, stream 240 and 250 are sent to remote media nodes. A single stream could be sent to a plurality of media nodes, or a plurality of streams could be sent to a single media node. As shown, the output stream 240 has the same compressed frames as input stream 210. The only difference between modified output stream 240 and the original input stream 210, is that modified output stream has metadata blocks 241, 242, 243, and 244 inserted in between encoded blocks 211, 212, 213 and 214. No encoded data from original input stream 210 has been altered. No PTS or DTS data from original input stream 210 has been altered. Metadata has only been added. No data has been changed.

Metadata transmitting module 238 transmits metadata 260 to a remote controller computer system. Metadata 260 generally includes at least the metadata inserted into modified compressed streams 240 and 250. Metadata 260 preferably includes all metadata generated by metadata generator 234, whether or not the generated metadata was inserted into modified compressed streams 240 and 250. In some embodiments, metadata 260 might include both frame identifiers and thumbnail images where the modified compressed streams only include frame identifiers. In other embodiments, metadata 260 also includes information such as when certain frames were received, so that the remote controller computer system could receive lag information and adjust the synchronizing signal accordingly.

Figure 3:
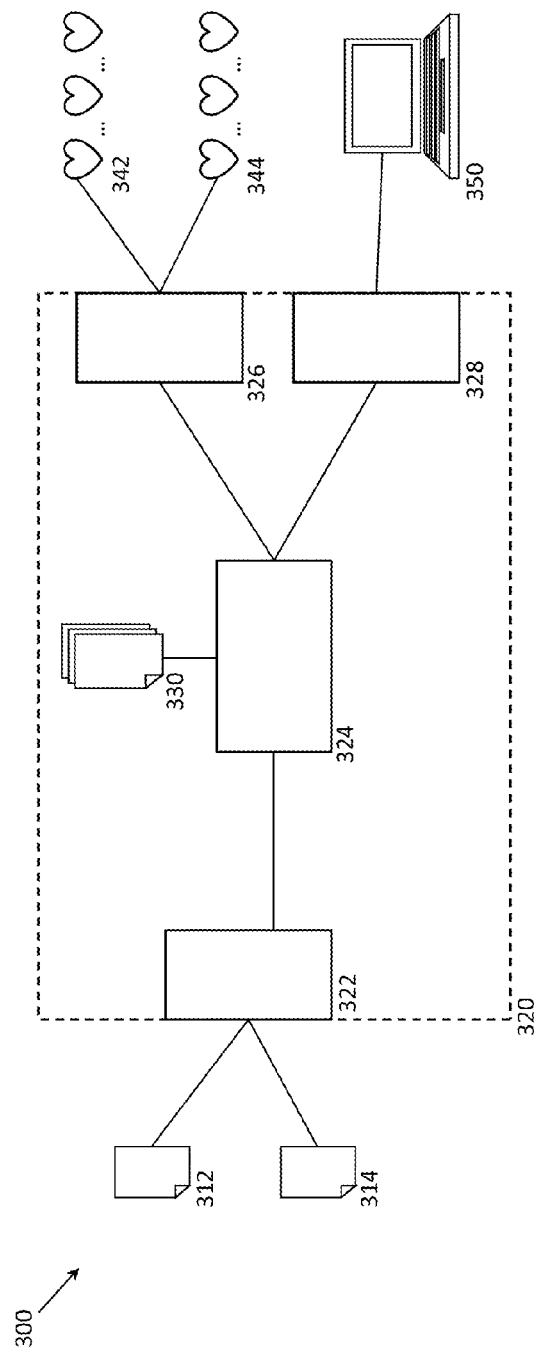
FIG. 3 is a software module schematic of a controller computer system of FIG. 1.

In FIG. 3, an exemplary software schematic 300 of the modules that could be instantiated in controller computer system 130 is shown, having metadata receiving module 322, controller module 324, synchronizing signal transmission module 326, and user interface module 328. Metadata receiving module 322 receives metadata 312 and 314 from one or more metadata computer systems through a suitable electronic communication medium. Controller module 324 aggregates received metadata 312 and 314 to construct index 330, which contains current index information. Controller module 324 could be configured to purge index 330 as metadata is used for a synchronizing signal, but is preferably configured to keep historical data for at least 1-2 hours to allow for a user to "rewind" to past media stream data if need be. Index 330 generally has metadata information such as frame index information that point to each meta data block in a media stream. Controller module 324 then reads index 330 for each media frame to generate a synchronizing signal "heart beat" that contains a frame identifier and a rendering time to broadcast the media signal. Such a "heart beat" could be sent regularly, such as every 50 milliseconds, every 100 milliseconds, every 200 milliseconds, every 400 milliseconds, every 500 milliseconds, every second, or every 2 seconds. Synchronizing signal 342, containing such synchronizing heart beat information is sent to a media node using transmission module 326.

Controller module 324 also preferably controls what portion of a media stream is rendered by a display node. Such media filter information is also preferably sent via some sort of regular "heart beat" pulse, such as media filter signal 344. In some embodiments, controller module 324 might send both the synchronizing signal and the media filter signal within the same heart beat. However, in other embodiments, media filter signal information might be sent with greater frequency than synchronizing signal information, or vice-versa.

Controller module 324 also interfaces with a user interface 350 through user interface module 328. User interface module 328 is used to allow a user to administer and control the system, such as controlling how frequent the synchronizing signal is, controlling how to apportion how often to generate metadata information, dictating how media streams are apportioned across media walls, speakers, or other media outlet devices, or other suitable administrative tasks. For example, where a user is dictating what media streams to display on a media wall, the user interface module 328 might display a virtualized media wall on user interface 420, and could then drag and drop where one media screen might be placed on the media wall. Or, where a user wishes to replay a section of a live-stream, controller module 324 might search index 330 for an appropriate thumbnail to display as the user scrolls backwards. By storing thumbnails in index 330, a user could quickly look at a previously rendered picture instead of waiting for a decoder to render a thumbnail, which requires processing time to scan through.

Figure 4:
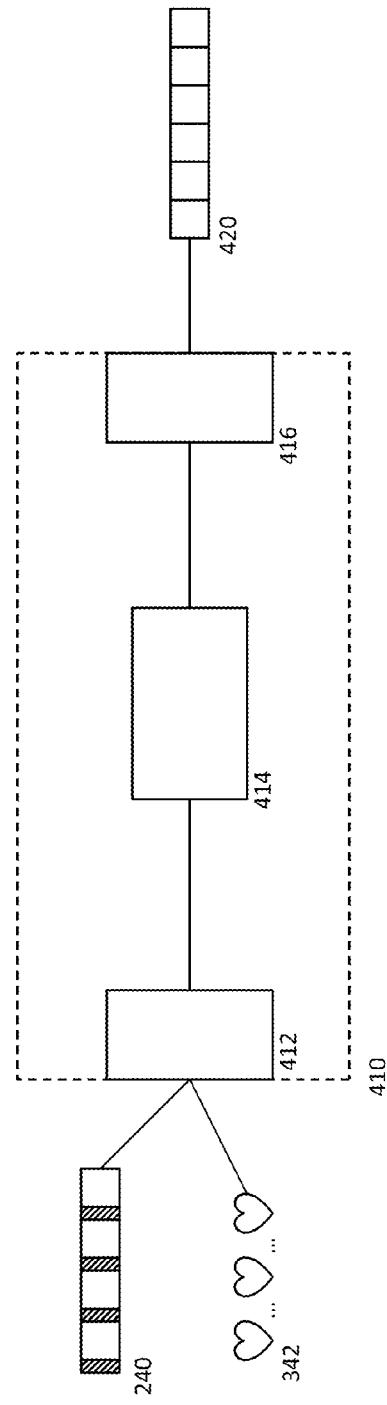
FIG. 4 is a software module schematic of a media node computer system of FIG. 1.

In FIG. 4, an exemplary software schematic 400 of the modules that could be instantiated in a media node computer system, such as media node computer system 161, is shown, having media stream receiver 412, media rendering module 414, and media streamer 416. Media stream receiver 412 is configured to receive modified compressed media streams, such as modified compressed media stream 240, as well as synchronizing signals and/or media filters, such as synchronizing signal 342. Media rendering module 414 then renders the media stream as a function of the synchronizing signals and/or media filters. In one simple embodiment, a synchronizing signal could contain heartbeat pulses of frame identifiers along with rendering time stamps, instructing media rendering module 414 to render the frame associated with the specified frame identifier at the specified rendering time stamp. Media rendering module 414 would then continue to render the stream until the next heartbeat pulse instruction. Media streamer 416 then streams the media stream 420 to a media outlet. In some embodiments, such a media stream might be the original encoded media stream received from the broadcast outlet, but in other embodiments media streamer 416 could decode the media stream for a suitable media output format, such as HDMI for a video stream.

Figure 5:
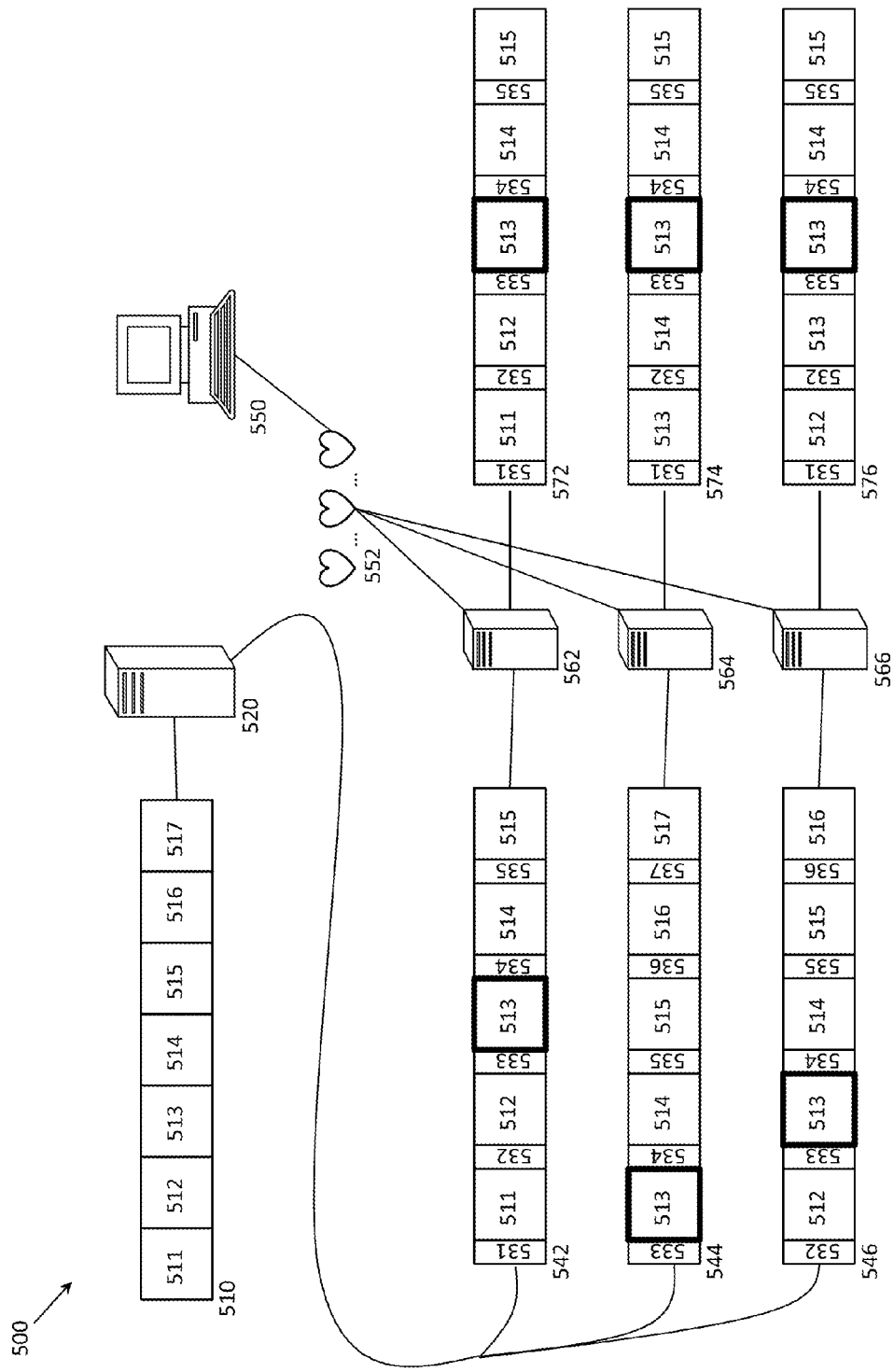
FIG. 5 shows a mapping synchronization logic structure of the present invention.

FIG. 5, better illustrates how frame data could be synchronized using the present invention. In illustration 500, an original compressed media stream 510 having encoded frames 511, 512, 513, 514, 515, 516, and 517 are received to metadata computer system 520. Metadata computer system 520 inserts metadata in between the encoded frames, and sends the streams to three separate media node computer systems 562, 564, and 566. Modified compressed media stream 542 is sent to media node computer system 562, modified compressed media stream 544 is sent to media node computer system 564, and modified compressed media stream 546 is sent to media node computer system 566. Each modified compressed media stream contains the original encoded frames 511, 512, 513, 514, 515, 516, and 517, with associated metadata 531, 532, 533, 534, 535, 536, and 537, respectively. The media streams, however, reach each intended computer system at different times due to lag in the system. Modified compressed media stream 544 reaches media node computer system 562 the soonest, while modified compressed media stream 542 reaches media node computer system 564 the latest.

Controller computer system 550 sends synchronizing signal 552 to media node computer systems 562, 564, and 566. The synchronizing signal 552 instructs the media nodes to render the media frame associated with metadata block 533, which is media frame 513, at a certain time stamp. Thus, while media stream 574 and 576 might start out ahead of media stream 572, at the time stamp, media stream quickly 574 and 576 synchronizes with media stream 572 and all three media node computer systems render media frame 513 simultaneously. If the heartbeat pulses are rapid enough, the synchronization could be so rapid the human eye won't notice a thing.

Figure 6:
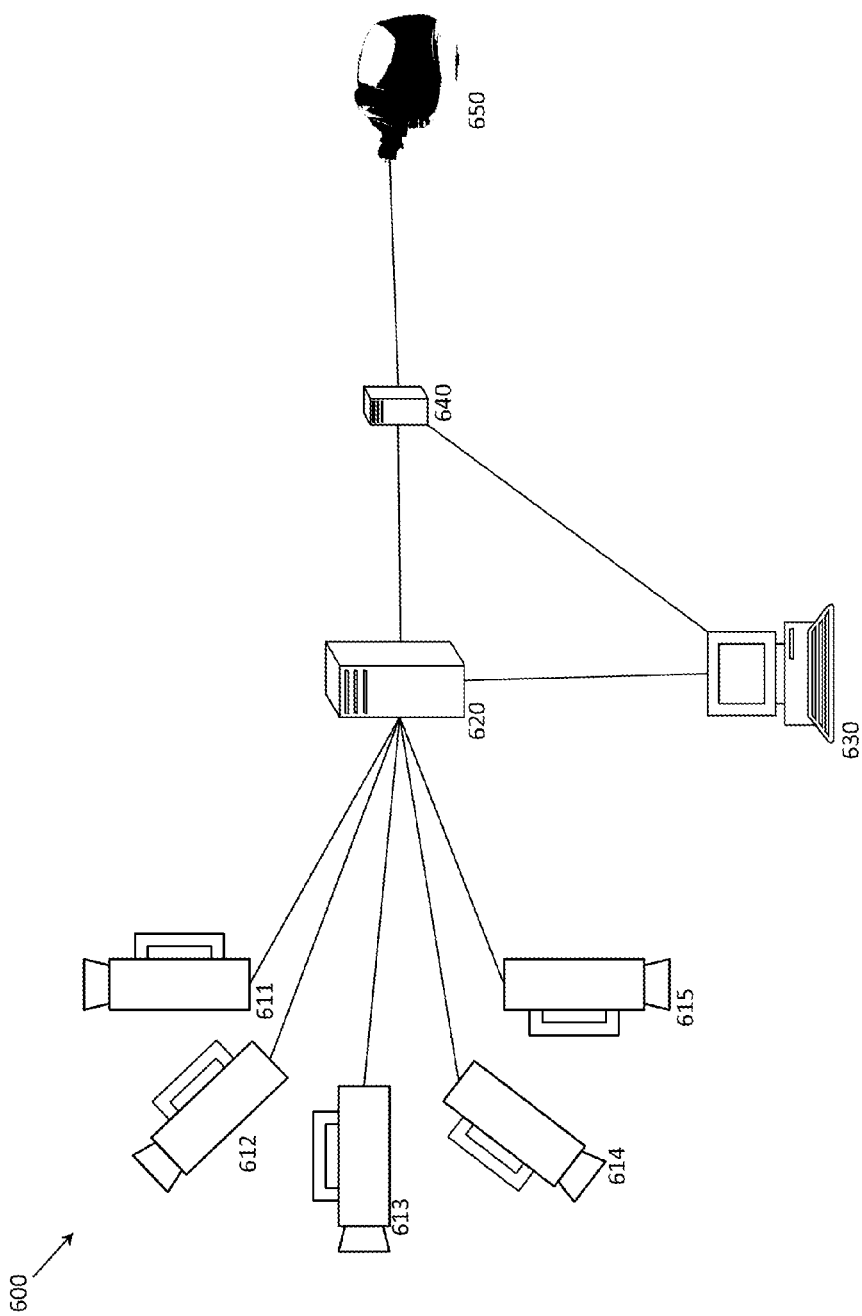
FIG. 6 is a hardware schematic of components of the present invention streaming several media feeds to a single media node.

In FIG. 6, another contemplated system 600 has a plurality of media broadcast devices 611, 612, 613, 614, and 615, a metadata computer system 620, a controller computer system 630, a media node computer system 640, and a media output device 650. Media broadcast devices 611, 612, 613, 614, and 615 are video camera devices capturing video information at a plurality of angles about a point. As the live streaming information is received by metadata computer system 620, metadata computer system 620 inserts metadata information into the compressed media stream and forwards the modified compressed media stream to media node computer system 640. Controller computer system 630 processes the generated metadata to generate index information and sends synchronizing information to media node computer system 640 (preferably as a heart beat pulse) to ensure all of the modified compressed media streams are synchronized with one another. Here, the many compressed media streams are then rendered upon the single media outlet 650, shown as a Virtual Reality (VR) display device that shifts a viewpoint as a user's head shifts from one viewing angle to another viewing angle. As the user viewing angle shifts from one side to another, only a subset of the media streams (e.g. 1-3 media streams) may be rendered by media node computer system 640, even though all five media streams are being sent to the media node computer system 640. If the user angle is looking just straight ahead, only the media stream from camera 613 might be displayed on the VR device, whereas if the user angle is moving to the side, media stream information from cameras 613, 614, and 615 might all be rendered during the transition from one viewpoint to another viewpoint.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system that synchronously renders a first compressed video stream, comprising:
   a stream receiver that receives the first compressed video stream from a first broadcast source, wherein the first compressed video stream comprises a first frame and a second frame;
   a metadata generator that inserts metadata comprising both a first frame identifier and a thumbnail of the second frame into the first compressed video stream between the first frame and the second frame to generate a modified first compressed video stream, wherein the first frame identifier identifies the second frame;
   a stream transmitter that transmits the modified first compressed video stream;
   a control transmitter that transmits a synchronizing signal generated using an index of the metadata, wherein the synchronization signal is used to synchronize a display of the modified first compressed video stream across a plurality of display nodes, wherein the synchronizing signal comprises an identification of the first frame identifier and a timestamp associated with the first frame identifier; and
   the plurality of display nodes that receive the modified first compressed video stream and the synchronizing signal, wherein each of the plurality of display nodes selectively presents the second frame identified by the first frame identifier at a time corresponding to the timestamp associated with the first frame identifier.

2. The system of claim 1, wherein the first frame comprises an encoded first frame and the second frame comprises an encoded second frame.

3. The system of claim 1, wherein the first compressed video stream comprises a first presentation time stamp corresponding to the first frame.

4. The system of claim 1, wherein the metadata generator is further configured to insert a second frame identifier into the first compressed video stream to generate the modified first compressed video stream.

5. The system of claim 1, wherein the thumbnail is generated using at least the second frame of the first compressed video stream.

6. The system of claim 5, further comprising a controller user interface configured to present the thumbnail as a visual representation of the second frame.

7. The system of claim 1, wherein the synchronizing signal comprises a series of frame identifiers each paired with a different time stamp.

8. The system of claim 1,
wherein the stream receiver is further configured to receive a second compressed video stream from a second broadcast source,
wherein the metadata generator is further configured to insert a second frame identifier into the second compressed video stream to generate a modified second compressed video stream,
wherein the transmitter is further configured to transmit the modified second compressed video stream to the plurality of display nodes, and
wherein each of the plurality of display nodes is also configured to selectively present the modified second compressed video stream as a function of the synchronizing signal.

9. The system of claim 8, wherein a first frame rate of the first compressed video stream is different from a second frame rate of the second compressed video stream.

10. A method of synchronously rendering a compressed video stream, comprising:
receiving a first compressed video stream by a stream receiving module, wherein the first compressed video stream comprises a first frame and a second frame;
inserting, by a metadata generation module, metadata comprising both a first frame identifier and a thumbnail of the second frame into the first compressed video stream between the first frame and the second frame to generate a modified first compressed video stream, wherein the first frame identifier identifies the second frame;
transmitting, by a stream transmission module, the modified first compressed video stream to a plurality of display nodes;
transmitting, by a control module, a synchronizing signal generated using an index of the metadata to the plurality of display nodes, wherein the synchronizing signal comprises an identification of the first frame identifier and a timestamp associated with the first frame identifier; and
presenting, by each of the display nodes, the second frame identified by the first frame identifier at a time corresponding to the timestamp associated with the first frame identifier.

11. The method of claim 10, wherein the first frame comprises an encoded first frame and the second frame comprises an encoded second frame.

12. The method of claim 10, wherein the first compressed video stream comprises a first presentation time stamp corresponding to the first frame.

13. The method of claim 10, further comprising inserting a second frame identifier into the first compressed video stream to generate the modified first compressed video stream.

14. The method of claim 10, further comprising inserting a frame identifier corresponding to every frame in the first compressed video stream.

15. The method of claim 10, further comprising generating the thumbnail using at least the second frame of the first compressed video stream.

16. The method of claim 15, further comprising presenting, via the control module, a video player user interface that presents the thumbnail as a visual representation of the second frame.

17. The method of claim 10, wherein the synchronizing signal comprises a series of frame identifiers, each paired with a different time stamp.

18. The method of claim 10, further comprising:
receiving, by the stream receiving module, a second compressed video stream;
inserting, by the metadata generation module, a second frame identifier into the second compressed video stream to generate a modified second compressed video stream;
transmitting, by the stream transmission module, the modified second compressed video stream to the plurality of display computing devices; and
presenting, by each of the plurality of display devices, the second modified compressed video stream as a function of the synchronizing signal.

* * * * *